United States Patent [19]

Lewis

[11] 4,229,704
[45] Oct. 21, 1980

[54] METHOD AND MEANS FOR MEASUREMENT AND CONTROL OF PULSED CHARGED BEAMS

[75] Inventor: Robert N. Lewis, Clarendon Hills, Ill.

[73] Assignee: The United States of America as represented by the United States Department of Energy, Washington, D.C.

[21] Appl. No.: 3,561

[22] Filed: Jan. 15, 1979

[51] Int. Cl.² ............................................. H01J 23/34
[52] U.S. Cl. ..................................... 328/233; 328/228
[58] Field of Search ....................... 328/227, 228, 233

[56] References Cited
PUBLICATIONS

Vibration-RF Control of Superconducting-Helix Resonators for Heavy-Ion Acceleration, Despe et al., Conference: IEEE Trans. Nucl. Sci. (U.S.A.), vol. NS-20, #3, Jun. 1973, S3171 0038, pp. 71-75.

Primary Examiner—Robert Segal
Attorney, Agent, or Firm—Richard G. Besha; Frank H. Jackson; Donald P. Reynolds

[57] ABSTRACT

A beam of bunches of charged particles is controlled by generating a signal in response to the passage of a bunch and adding to that signal a phase-flipped reference signal. The sum is amplified, detected, and applied to a synchronous detector to obtain a comparison of the phase of the reference signal with the phase of the signal responsive to the bunch. The comparison provides an error signal to control bunching.

2 Claims, 9 Drawing Figures

METHOD AND MEANS FOR MEASUREMENT AND CONTROL OF PULSED CHARGED BEAMS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to pulsed beams of charged particles. In particular, it is directed to measurement and control of the phase of bunches of charged particles in a beam.

It is frequently important to have an accurate measurement of the phase of bunches of charged particles in a repetitive pulsed beam. It is also frequently of importance to control the bunching of such particles in response to the error from a fixed reference in order to maintain control of the phase. This is sometimes referred to as reducing pulse-separation jitter. It may also be desirable to control the signal input to a buncher to reduce the time spread in a bunch of charged partilces. In research accelerators precision control of bunching of a beam that is injected into an RF accelerator makes it possible to exercise more precise control on the output energy. Furthermore, the control of the phase is facilitated by the generation of an output signal marking the centroid of a pulse of charges and this information is useful as a time marker for time-of-flight experiments and the like. These considerations are not only of importance to the operation of a particle accelerator for research purposes but also have extensions to the use of precision particle beams in controlling diagnostic and therapeutic x-rays and timing pulses for injection in attempts to achieve thermonuclear fusion by beams of ions.

A pulsed beam is commonly achieved by generating a dc beam and passing that beam through a buncher. The buncher accelerates some charged particles and decelerates others so that after a period of drift at varying speeds a portion of the beam is compacted into a bunch. This is similar to the bunching performed in a klystron, for example. However, as with a klystron, variations in the accelerating voltage, the initial entering velocity of the charged particles or voltages from any other power supplies in the system can cause spread in the width of the pulse of charged particles that has been bunched. If the bunch is to be subjected to further acceleration, then the accelerated bunch will probably be spread still further in energy.

It is an object of the present invention to provide a method and means of measuring and controlling the phase of a bunch of charged particles in a particle accelerator.

Other objects will become apparent in the course of a detailed description of the invention.

SUMMARY OF THE INVENTION

The phase of a bunched beam of charged particles in an accelerator is measured and controlled by passing the beam through a high-Q circuit to generate an electrical signal timed to the pulse. This signal is added to a reference ac signal that is reversed in phase at an audio rate. The sum of the reference signal and the signal induced by the beam is amplified and demodulated in a radio receiver and the demodulated signal is applied to a synchronous detector to provide a comparison of the phase of the separately added signals. Application of the output signal from the synchronous detector to a voltage-controlled phase shifter generates a signal for application to the buncher to optimize bunching of the charged particles.

DETAILED DESCRIPTION OF THE INVENTION

Figure 1:
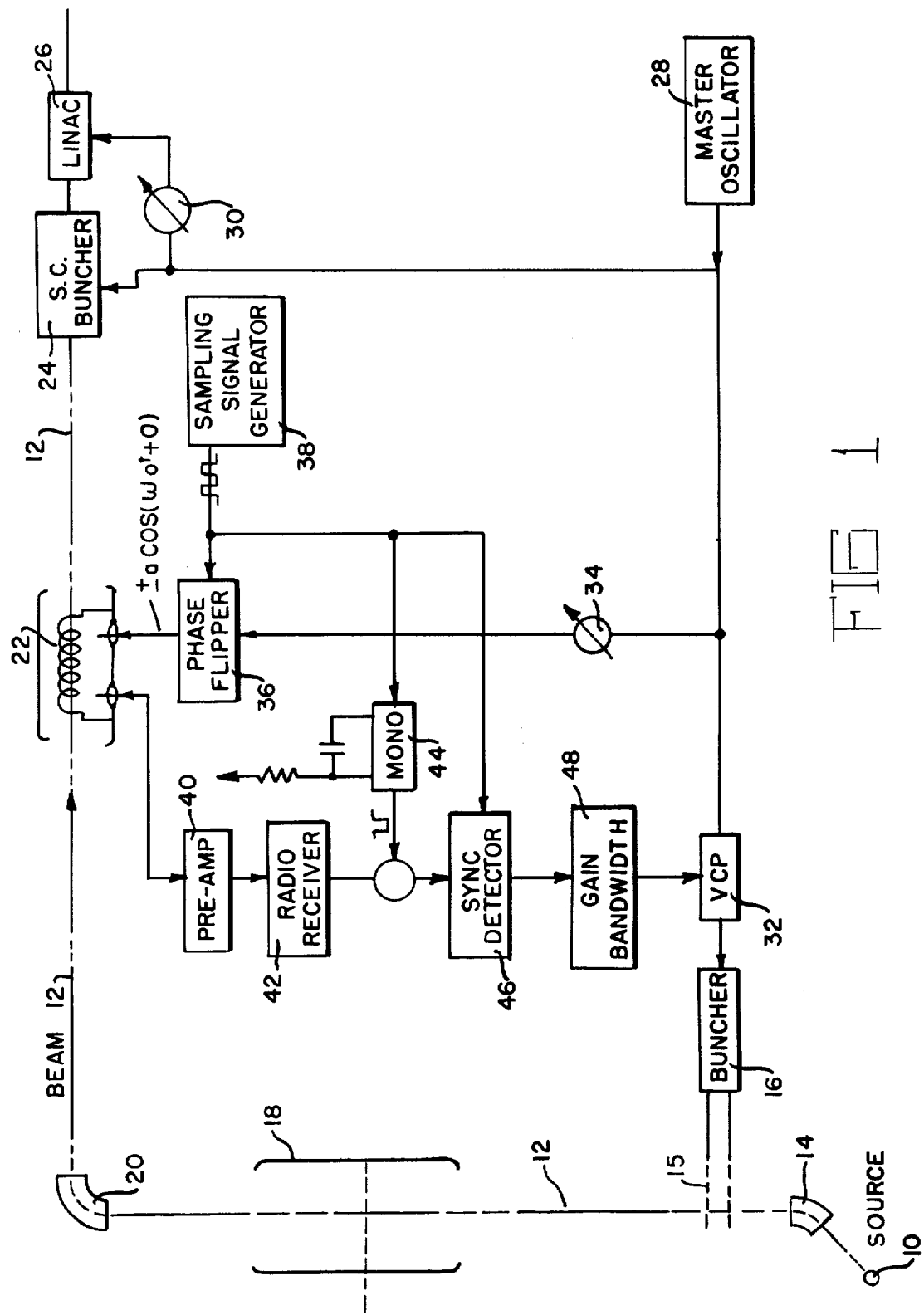
FIG. 1 is an overall block diagram of an apparatus for the practice of the present invention.

FIG. 1 is a block diagram showing the apparatus of the present invention in operation on an accelerator. In FIG. 1, source 10 generates a beam 12 of ions that are to be accelerated. The beam 12 is bent in a bending magnet 14 and directed through the grids 15 of a buncher 16. The buncher 16 receives an alternating voltage that may be a sinusoid or a sawtooth at a high frequency. This voltage is applied to the beam 12 so as alternately to accelerate and decelerate the beam 12. The beam then proceedes to an accelerator 18 that is typically a Tandem Van de Graaff. From the accelerator 18 beam 12 is bent by another bending magnet 20 and directed through a helix 22. As a result of the time taken for the beam 12 to go from buncher 16 to helix 22 and the alternating components of acceleration and deceleration that have been applied to the beam at buncher 16, the beam 12 arrives at helix 22 in bunches. The purpose of the present invention is to detect the phase of those bunches nondestructively through the use of helix 22 and to generate and apply control signals to control the phase of the bunches. This is desirable because the beam 12 goes from helix 22 for further uses in accelerators or in units for radiography in which precision bunching and precision control of the phase may be important in improving the operation of the later equipment. For example, FIG. 1 shows as a possible application the delivery of the beam 12 to a superconducting buncher 24 in which the beam is further bunched for delivery to a linac 26. Operation of the buncher 24 and the linac 26 is facilitated by having narrow bunches arrive for acceleration in closely controlled phase.

Control of the operation is timed from a master oscillator 28 which is connected to the superconducting buncher 24 and through a variable phase controller 30 to linac 26. The signal from the master oscillator is also taken to control the timing of buncher 16 through a voltage-controlled phase controller (VCP) 32. Voltage for the VCP 32 is derived by connecting the signal from the master oscillator through a variable phase controller 34 to a phase flipper 36. The input to the phase flipper 36 comprises a reference voltage that is reversed in phase by phase flipper 36 under the control of a sampling signal from sampling signal generator 38. The reference voltage from phase flipper 36 in each of its phases is coupled capacitively to helix 22 where it is added to the voltage developed across helix 22 by the passage through helix 22 of a bunch of ions in beam 12. The signal comprising the sum of these two voltages is coupled capacitively to preamplifier 40 and thence to radio receiver 42 which is used as a high-gain tunable amplifier and detector. The amplitude-detected output from radio receiver 42 is passed through a gate that is controlled by a signal obtained by applying the output of sampling signal generator 38 to a monostable element 44. The gate-off signal occurs twice per sampling cycle, i.e., at each phase flip of the reference signal. This is done to gate off undesirable signals caused during phase flip of the reference signal. The output of the gate is applied to a sync detector 46 that is gated by the signal from sampling signal generator 38 and the output of sync detector 46 is applied to gain-bandwidth unit 48 to derive a voltage that is applied to control VCP 32 and hence the phase of the signal at buncher 16.

Figure 2:
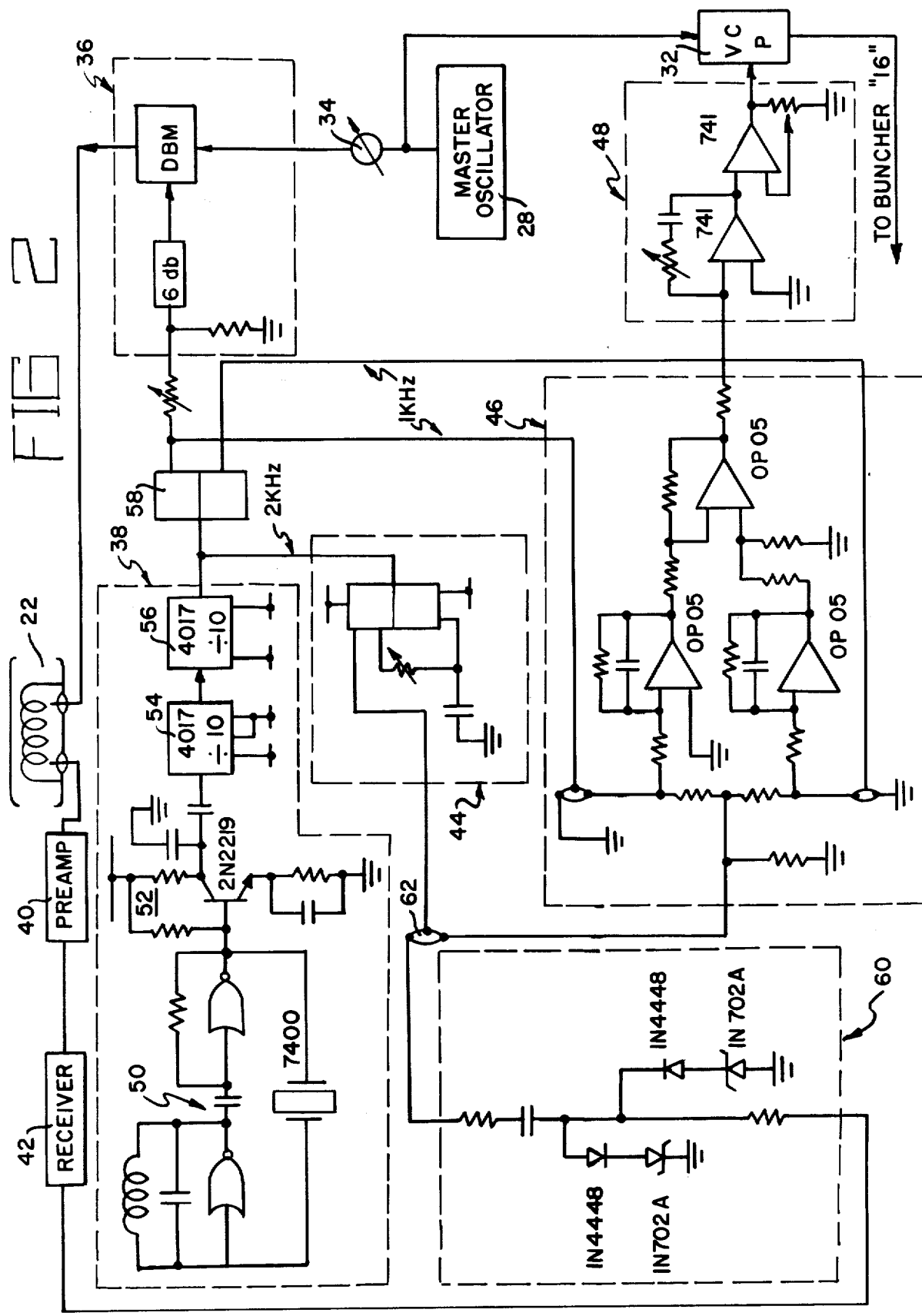
FIG. 2 is an expanded view of a portion of the electronic circuits included in FIG. 1.

Further details of the operation can be seen in FIG. 2 in which the corresponding elements of FIG. 1 are given the same numbers. In FIG. 2 sampling signal generator 38 is a combination in which crystal-controlled oscillator 50 is connected to a transistor amplifier 52, thence to a pair of cascaded counters 54 and 56, which divide its input to produce a square wave at a frequency of 2 kilohertz. The output of counter 56 is coupled to monostable element 44 which is a flip-flop connected as a monostable multivibrator. The output of counter 56 is also connected through flip-flop 58 which produces a 1 kilohertz square wave to phase flipper 36 and to sync detector 46. Phase flipper 36 is a double balanced mixer that also receives as an input a signal from master oscillator 28 that is shifted controllably in phase by variable phase controller 34. The output of phase flipper 36 is a sinusoidal voltage at the frequency of master oscillator 28 that is reversed in phase by 180° at a rate of 1 kilohertz. That signal is applied to helix 22 as the reference signal, to be added to the signal generated in helix 22 by the passage therethrough of a pulse of ions. Helix 22 is selected and tuned to be a half-wave resonant transmission line at the frequency of master oscillator 28. Such a line typically has a Q of at least 1000. Oscillations in helix 22 are excited by two signals. First, the passage through helix 22 of a bunch excites an oscillation at the resonant frequency that is timed to the passage of the bunch. Second, capacitive coupling to helix 22 excites helix 22 with the reference signal. The sum of these two signals is coupled capacitively to preamplifier 40 and is amplified there and in receiver 42. After passage through a peak limiter 60, the signal is applied to sync detector 46 through a switch 62 that is operated by the output of monostable element 44. Detector 46 produces an output that is proportional to the modulation of the combined signal from receiver 42, and the detected output is applied to gain-bandwidth unit 48. This is a pair of stages of controlled variable amplification and integration, the output of which is in turn applied to VCP 32. Individual integrated circuits and selected circuit elements are identified by number in FIG. 4 and their function is identified by association with that number in Table I.

TABLE I

| Element Number | Function |
| --- | --- |
| 7400 | Quad Position NAND gate |
| 2N2219 | NPN Transistor |
| 4017 | Counter Divider |
| 4013 | Dual D Flip-Flop |
| DBM | Double Balanced Mixer |
| 1N4448 | Diode |
| 1N446 | Diode |
| 1N702A | Zener Diode |
| 4016 | Quad Bilateral Switch |
| OP-05 | Precision Operational Amplifier |
| 741 | Operational Amplifier |
| VCP | Merrimac PSE-3 Series Voltage-Controlled Phase Shifter |

Figure 3A:
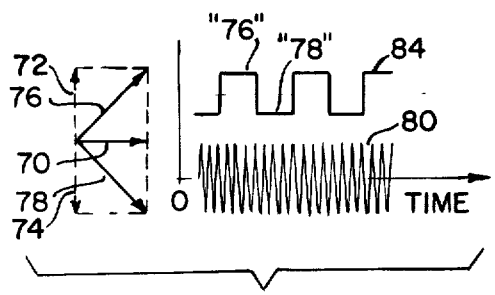
FIGS. 3a-c are a sketch of phasor and time relations of the voltages in FIG. 1.

The various conditions for comparison of a received signal with a reference signal are shown in FIG. 3 both as phasor diagrams and as time plots. FIG. 3A shows the condition when the phase error is zero. This is evidenced by the fact that phasor 70 representing the voltage induced by the passage of a pulse in the beam is 90° behind phasor 72 and 90° ahead of phasor 74. Phasors 72 and 74 are equal in magnitude and represent the reference voltage and its reversal in phase by 180°. Phasor 76 represents the sum of phasors 70 and 72 while phasor 78 represents the sum of phasors 70 and 74. Since phasors 72 and 74 represent the sinusoids that are applied alternately as reference signals to the helix to add to the signal represented by phasor 70, the result of the addition is a time signal that is switched at the same rate between the signals associated with phasors 76 and 78. These have the same amplitude so that the resultant output is the sinusoid 80 having a constant amplitude. Switching transients are ignored in this drawing because of the uncertainty as to when in time switching will take place. This is rendered academic in any event because the switching transients will be gated off. Phase flip of the reference signal represents phase modulation and gives rise to an rf spectrum that can easily exceed the bandwidth of the rf amplifiers. This causes spurious responses in the output of the radio receiver. A gating signal is thus required to gate off the false signal that occurs twice per sampling cycle. The action is accomplished by monostable element 44.

Figure 3B:
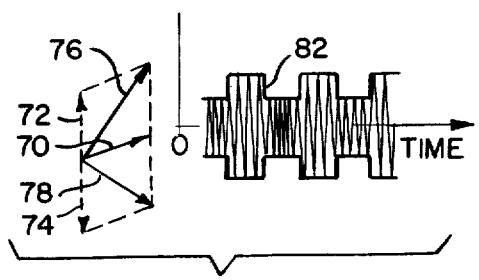
Figure 3C:
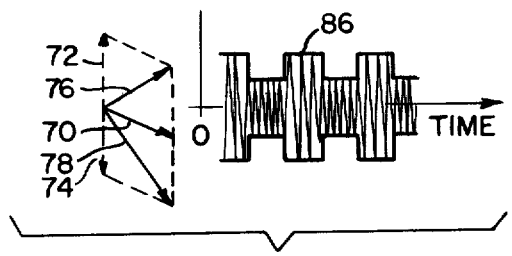

FIG. 3B is a plot of the phasors and the associated time diagram when the beam is early in phase or advanced in time. Phasors 72 and 74 maintain the same relationship with respect to each other that they had before. Phasor 70 is unchanged in amplitude but is advanced in phase so that the angle between phasor 70 and phasor 72 is less than 90°. As a result phasor 76 representing the sum of phasors 70 and 72 is greater in amplitude than phasor 78 which represents the sum of phasors 70 and 74. The result is that switching from phasor 76 to 78 generates across helix 22 the amplitude-modulated signal that is plotted as a function of time in FIG. 3B. The resulting curve 82 can be seen by reference to curve 84 to be larger during the time that phasor 76 is switched on and smaller in amplitude during the time phasor 78 is switched on. Those times are indicated respectively by the intervals that are noted as "76" and "78". The reverse of the situation just described is shown in FIG. 3C in which phasor 70 represents the result obtained when the beam phase is late. In FIG. 3C phasor 76 is smaller in amplitude than phasor 78 and curve 86 illustrates the result in time of switching between phasors 76 and 78.

Figure 4:
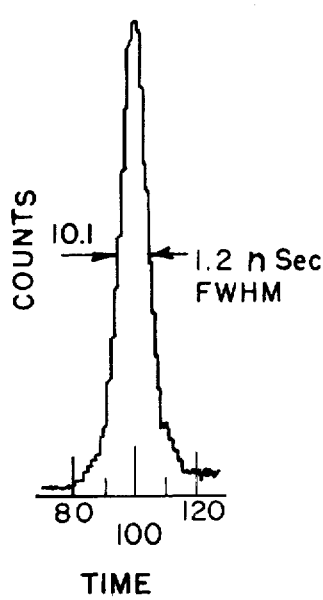
FIG. 4 is a plot showing the spread of a bunched beam of carbon ions without the use of the apparatus of the present invention.
Figure 5:
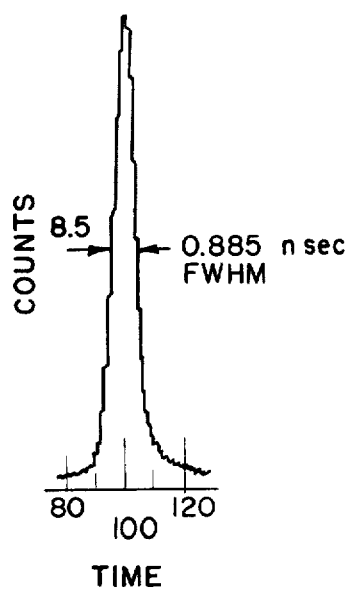
FIG. 5 is a plot showing the spread of the bunched beam of carbon ions with the apparatus of the present invention in operation.
Figure 6:
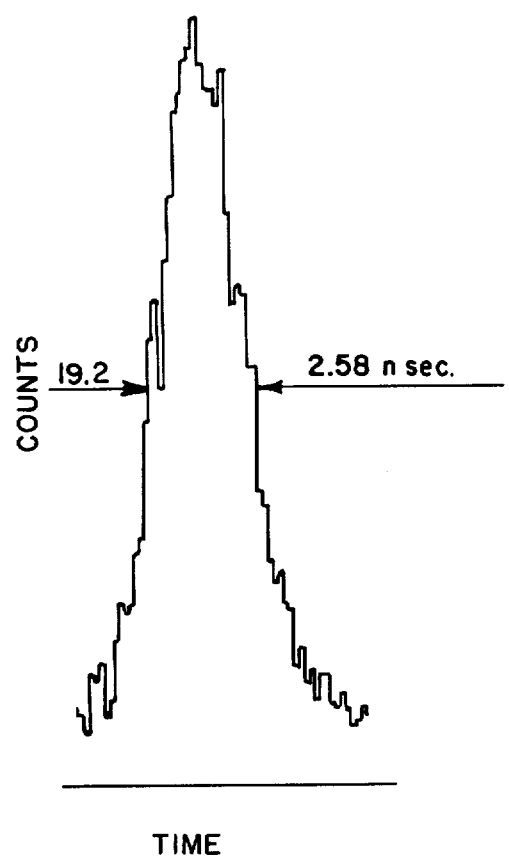
FIG. 6 is a plot showing the spread of a bunched beam of nickel ions without the use of the apparatus of the present invention.
Figure 7:
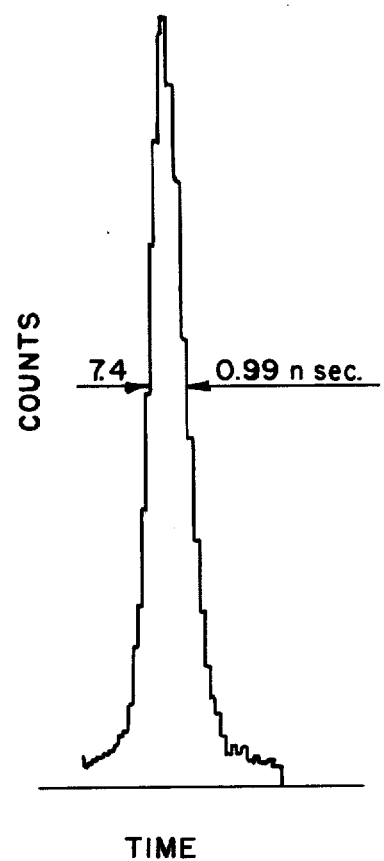
FIG. 7 is a plot showing the spread of the bunched beam of nickel ions with the apparatus of the present invention in operation.

FIGS. 4, 5, 6 and 7 are representations of plots from multichannel counters that represent counts of particle pulses as a function of time. Thus these pulses represent the spread of the phase of bunches with respect to a time measure that is taken most appropriately as the center of each of the bunches. FIGS. 4–7 were obtained on the bunched output of a Tandem Van de Graaff accelerator at the Argonne National Laboratory. This accelerator was used as an input device for the superconducting helix that is a further buncher for application to a linear accelerator. FIG. 4 represents the time spread observed in 15 minutes of normal operation of the accelerator on a beam of carbon ions without the phase controller of the present invention in operation. The detected bunches have a full-width, half-maximum (FWHM) spread of 1.2 nanoseconds. This is the result of uncompensated variations of power-supply voltages and the uncorrected minor drifts that occur for other reasons. FIG. 5 is a comparable plot obtained over a period of 90 minutes with the circuit of the present invention applied to control phase of the pulsed beam of carbon ions. It can be seen from FIG. 5 that even over the longer measuring interval, during which more variation might be expected to occur, the use of this circuit has reduced the FWHM value of the detected bunches to 0.885 nanoseconds. This is a significant improvement in phase control of the pulses that will lead to more sharply defined injection time into any equipment that follows the buncher, first accelerator and detector. Similarly, FIG. 6 shows the time spread observed in 15 minutes of acceleration of a pulsed beam of nickel ions, which are more massive and hence more subject to transit time variations than the lighter carbon ions of FIGS. 4 and 5 due to their lower velocity. FIG. 7 shows the improvement obtained by use of the apparatus of the present invention.

The embodiments of the invention in which an exclusive property or priviledge is claimed are defined as follows:

1. A method of controlling time separation of adjacent bunches of charged particles in a beam of bunched charged particles comprising the steps of:
   exciting a resonant circuit in response to passage nearby of a bunch of charged particles to generate a signal voltage;
   generating an ac signal at a frequency near resonance of the resonant circuit;
   reversing the phase of the ac signal periodically at a low frequency that is below the frequency of the ac signal to generate a phase-flipped reference signal;
   adding the phase-flipped reference signal to the signal voltage to obtain a summed voltage;
   amplifying the summed voltage;
   detecting an envelope of the summed voltage at the low frequency;
   gating the envelope to eliminate transient voltages generated by reversing the phase of the ac signal;
   detecting the gated envelope to obtain an error signal proportional to phase of the signal voltage with respect to phase of the reference signal, and
   applying the error signal to control timing of bunches to maintain a phase of the phase-flipped reference signal, whereby the time separation of adjacent bunches is synchronized to the ac signal.

2. An apparatus for controlling time separation of adjacent bunches of charged particles in a beam of bunches of charged particles produced by a periodically driven buncher, the apparatus comprising:
   a half-wave transmission line formed in a helix and placed to enclose the beam and generate electrical oscillations in the helix in response to passage of a bunch;
   a master oscillator generating a sinusoidal signal substantially at the frequency of the electrical oscillation in the helix;
   a phase shifter connected to the master oscillator for effecting a change in phase of the sinusoidal signal;
   a phase flipper connected to the phase shifter to receive the sinusoidal signal and effect phase reversals of the signal at a predetermined rate to generate a phase-flipped reference signal;
   means for adding the phase-flipped reference signal to the oscillations in the helix to obtain a summed signal;
   means for amplifying the summed signal to obtain an amplified summed signal;
   means for detecting the amplified summed signal to obtain a detected envelope;
   means for gating the detected envelope at the predetermined rate to eliminate switching transients;
   a synchronous detector coupled to the means for gating and receiving therefrom the gated detected envelope to generate a control signal voltage responsive to imbalance in the reversal of the phase-flipped reference signal;
   a voltage-controlled phase shifter connected to the buncher, the phase shifter receiving as an input the sinusoidal signal from the master oscillator, the phase shifter controlled by the control signal voltage from the synchronous detector and delivering to the buncher a phase-shifted sinusoidal signal that is varried in phase in response to the imbalance in reversals of the phase-flipped reference signal, whereby the separation of adjacent bunches of charged particles in the beam is controlled.

* * * * *